June 18, 1957  R. HUBER  2,795,927
STARTERS FOR FREE PISTON ENGINES, MORE PARTICULARLY
FOR FREE PISTON PRIME MOVERS
Filed Jan. 17, 1956  3 Sheets-Sheet 1

INVENTOR
Robert Huber
BY
Bailey Stephens & Huettig
ATTORNEYS

June 18, 1957  R. HUBER  2,795,927
STARTERS FOR FREE PISTON ENGINES, MORE PARTICULARLY
FOR FREE PISTON PRIME MOVERS
Filed Jan. 17, 1956  3 Sheets-Sheet 2

INVENTOR
Robert Huber
BY
ATTORNEYS

United States Patent Office 2,795,927
Patented June 18, 1957

2,795,927

STARTERS FOR FREE PISTON ENGINES, MORE PARTICULARLY FOR FREE PISTON PRIME MOVERS

Robert Huber, Bellevue, France, assignor to Société d'Etudes et de Participations Eau, Gaz, Electricite, Energie, S. A., Geneva, Switzerland, a Swiss society Application January 17, 1956, Serial No. 559,696

Claims priority, application France February 2, 1955

11 Claims. (Cl. 60—14)

The present invention relates to starters for free piston engines and more particularly but not exclusively for free piston gas generators, that is to say engines comprising a driving part and a compressing part, the driving part being supplied with compressed air by the compressing part and delivering through its exhaust ports a gaseous mixture comprising the excess of scavenging air and combustion gases which have been incompletely expanded in the said driving part, the said gaseous mixture being supplied to a driven part, such for example as a turbine, which is driven by the said gases.

The chief object of my invention is to provide starters for such engines which are better adapted to meet the requirements of practice than those known at the present time and in particular which are capable of starting gas generators of small dimensions such as those used to drive vehicles, more particularly road vehicles, in which the sole energy source available for starting the gas generator and for positioning the free piston or free pistons prior into starting position is the current supplied by the vehicle battery.

Figure 1:
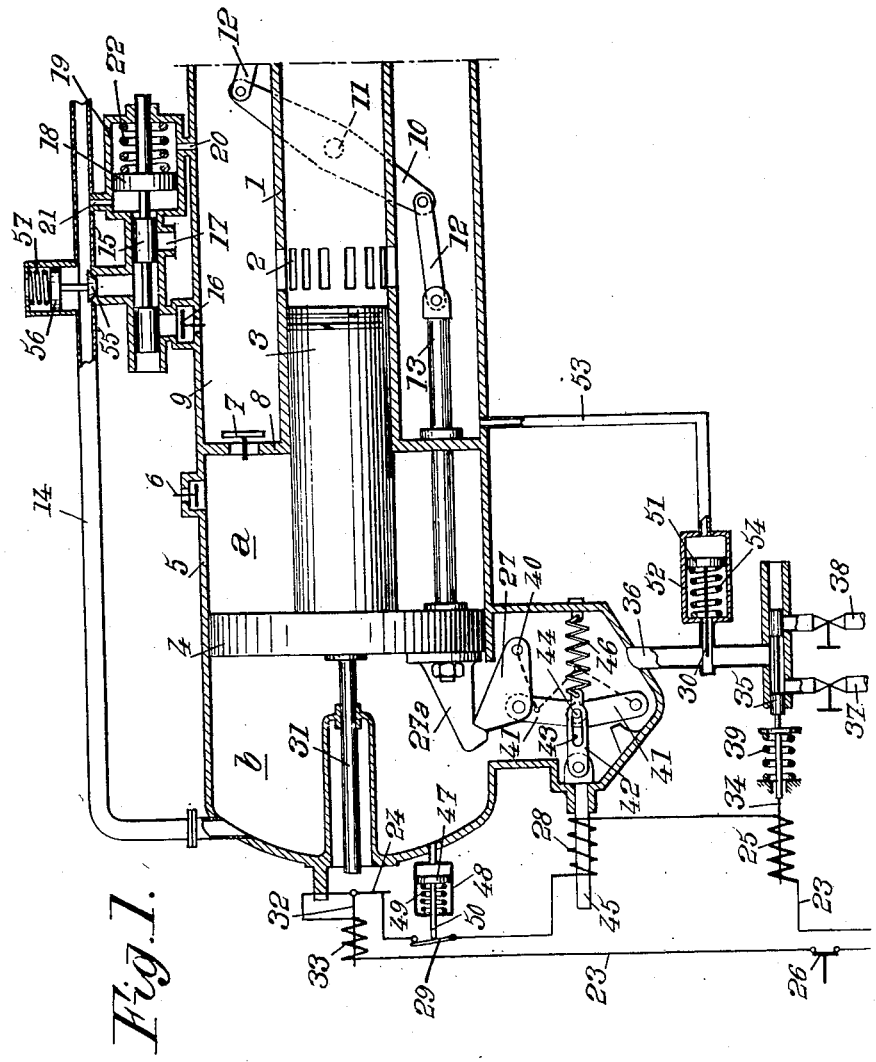

Preferred embodiments of my invention will be hereinafter described with reference to the accompanying drawings given merely by way of example and in which:

Fig. 1 is a diagrammatic part sectional view of a gas generator having opposed free pistons and equipped with a starter according to the present invention, whilst Figs. 2 to 5 diagrammatically show four different modifications of such a starter.

The gas generators to be described are well adapted to be mounted on a road vehicle such as a lorry, the starter having as source of energy, for example, the vehicle battery.

In the example shown in Fig. 1, the gas generator comprises a driving part mainly formed by a power cylinder 1 having inlet ports 2 and exhaust ports (not shown) and operating on the two stroke diesel cycle. Operating in the cylinder 1 are two power pistons 3, only one of which is shown in Fig. 1. The pistons 3 move in opposite directions to one another, one of them controlling the inlet ports 2 and the other controlling the exhaust ports. Fuel is injected into the power cylinder 1 by an injector (not shown) at the time the two pistons 3 are near their inner dead points.

Each of the power pistons is rigidly connected to a compressor piston 4 and each compressor piston 4 operates in a compressor cylinder 5. The engine has two compressor cylinders 5 disposed at the two ends of the power cylinder 1 respectively and forming with the compressor pistons 4 the compressor part of the machine. Each compressor cylinder 5 includes a chamber a located on the inward side of the corresponding compressor piston 4, and adapted to act as the compressor cylinder proper. For this purpose, chamber a is provided with inlet valves 6 and delivery valves 7, the latter being arranged in a partition 8 separating chamber a from the inside of a casing 9. This casing 9 surrounds the power cylinder 1 and acts as a reservoir containing supply and scavenging air under pressure for the said power cylinder. A chamber b of the compressor cylinder 5 located on the outward side of piston 4, serves as a return energy accumulator or air cushion, storing energy during the outward stroke of the pistons 3, 4 and returning this energy to produce the inward stroke of the said pistons. It is during the latter stroke that, on the one hand, air is compressed in the compressor chamber a and compressed air is delivered into the casing 9 and, on the other hand, combustion air is compressed in the engine cylinder 1.

The free piston assemblies 3, 4 at the respective ends of the machine are interconnected by synchronising means comprising a lever 10, oscillating upon a spindle 11 about a stationary axis, and rods 12 which connect the two ends of the lever 10 to rods 13 fixed to the compressor pistons 4.

The pneumatic energy accumulators b are interconnected through a pipe 14 which is also connected, through a device called a stabiliser, to the casing 9 containing the compressed air which has been compressed in the compressor chamber a.

In this example the stabiliser comprises a slide valve 15 which, according to its position, places the pipe 14 in communication either with casing 9 (a non-return valve 16 permitting a stream of compressed air to flow only from the casing 9 towards the accumulators b) or with the atmosphere, through an aperture 17 permitting air to escape from the accumulators. Finally, when in central position, as shown in Fig. 1, the slide valve 15 shuts off the pipe 14 both from the casing 9 and from the atmosphere.

The slide valve 15 is controlled in dependence upon the pressure in the casing 9 and in dependence upon the mean pressure in the accumulators b or upon some other pressure characteristic of these accumulators b. To this end, the slide valve 15 is rigidly connected to a piston 18 which divides a cylinder 19 into two chambers, one of which is connected through a passage 20 to the casing 9 and the other of which is connected through a calibrated passage 21 to the pipe 14, the cross-section of the passage 21 being small enough for the pressure in the second chamber to correspond to the mean pressure in the accumulators b. Finally, a spring 22 acts upon the piston 18 in the same direction as the pressure in the casing 9.

When this last mentioned pressure, which corresponds to the delivery pressure of the gas generator, rises, compressed air is returned from the casing to the accumulators and thus increases the quantity of air therein, whereas a reduction in the pressure in the casing 9 places the pipe 14 in communication with the atmosphere, so that a relatively large portion of the air contained in the accumulators can escape, the quantity of air therein thus being reduced.

In order to start a free piston engine, more particularly a gas generator, it is known to introduce into one of the variable volume chambers of the engine, for example into the accumulators b, a certain quantity of compressed starting air after the free piston or free pistons of the engine has or have been brought into the starting position (which usually corresponds to free pistons being at their maximum distance from the centre of the engine) and locked or retained in this last mentioned position.

One object of my invention is to control such a starting device by means of a control circuit, for example an electric circuit, adapted to be remotely controlled and requiring little energy, for example an amount of energy which can be supplied by the battery of the vehicle on which the gas generator is mounted.

Starting proper, that is to say release of the free pistons or free piston assemblies 3, 4 to let them perform their first inward stroke, is controlled by means of a circuit 23 (in this example an electric circuit supplied, for example, by the vehicle battery) which, according to my invention, includes, inserted in series therein, the following elements:

1. A switch 24 which is closed when the piston assembly 3, 4 has been brought into an outer position beyond the outer position reached by the piston assembly 3, 4 during normal engine operation, this switch 24 being preferably kept closed as a result of the closing of the circuit 23 and therefore as long as this circuit 23 remains closed;

2. A member 25 which controls the supply of starting air to the accumulator b, and 3. A second switch 26 which enables the operator to close or open the circuit 23.

Therefore the closing of the switch 26 can cause the accumulator or accumulators b to be filled with compressed starting air only if the free pistons have previously been brought into the starting position where the said pistons are held by a stop 27 the retraction of which, once the accumulators have been filled with starting air, produces the starting stroke, that is, the first stroke of the free piston assembly or assemblies 3, 4 towards their inner dead points.

Preferably, the circuit 23 also includes two other elements, to wit:

A motor device 28 which, when the circuit 23 is closed, is operated by the energy conveyed through this circuit to bring the stop 27 into the locking position thereof;

And another switch 29 which is operated in response to variation of the pressure in the accumulator b so as to open the circuit 23 when the starting pressure in the accumulator b has been reached, thus causing retraction of the stop 27, so that the free piston assembly 3, 4 is then released and performs its first inward stroke under the effect of the starting air.

To bring the pistons 3, 4 into the outer position thereof where they close the switch 24, it is usually advantageous to reduce the pressure in the same chamber into which compressed air is introduced subsequently, that is to say the accumulator b of the engine.

To this end, the arrangement is such that the valve means through which compressed starting air is supplied to the accumulator b when the circuit 23 is closed, establishes, when this circuit 23 is opened, a communication between the accumulator b and a vacuum source, such for instance, as a suction pump. Advantageously, a slide valve 30 or the like is provided in the pipe connecting the accumulator b to the vacuum source to interrupt the last mentioned communication when the engine runs normally after starting.

The various elements and devices hereinbefore described can of course be constructed in various ways. However, the embodiments illustrated in the drawings are at present preferred.

According to Fig. 1, the switch 24 is closed by a rod 31 which is rigidly connected to one of the piston assemblies 3, 4 and which engages and closes the switch 24 when the piston assembly has reached the extreme outer position. The switch 24 is also acted upon by an electromagnet formed by an armature 32 and a winding 33 included in the circuit 23. Therefore, as long as circuit 23 is closed, the electromagnet 32, 33 keeps the switch 24 closed even when the rod 31 ceases to engage it. A spring or other conventional means is provided to open the switch 24 as soon as the circuit 23 is opened and rod 31 is not acting on the said switch.

The means 25 for controlling the supply of compressed air to the accumulator b is also formed by a winding inserted in the electric circuit 23 and which co-operates with an armature 34 connected to a slide valve 35 inserted between a pipe 36 leading to the accumulator b and two other pipes 37 and 38 provided with stop cocks. The pipe 37 is connected to a source of compressed starting air and the pipe 38 is connected to a vacuum source. A spring 39 tends to maintain the slide valve 35 in a position in which the slide valve places the pipe 36 in communication with the vacuum pipe 38 whereby air can be withdrawn from the accumulator b, whereas the closing of the circuit 23 causes the slide valve 35 to move into the position which is illustrated in Fig. 1 and in which the pipe 36 is in communication with the pipe 37 connected to the source of compressed starting air.

The locking stop 27 is pivotally mounted about a spindle 40 and, when in the upper position shown in Fig. 1, engages a hook 27a rigidly connected to the free piston assembly 3, 4 and thus prevents this assembly from moving inwardly.

The stop 27 is controlled through the agency of a system comprising two links 41 forming a knuckle joint. When the links 41 are at least substantially aligned, the stop is in the locking position shown in Fig. 1, but when the links 41 and the knuckle joint form a bent line diagrammatically shown in dotted lines, the stop is lowered and unlocks the piston assembly 3, 4. The knuckle joint is brought into one or other of these two positions by a pull exerted in one or the other direction by a rod 42 having an elongated aperture or slot 43 in which is engaged a pin 44 rigid with the spindle about which the two links 41 of the knuckle joint are articulated together. The slotted rod 42 is coupled with a rod 45 which co-operates as an armature with the winding 28. When current flows through the winding 28, the rod 45 is urged toward the left in Fig. 1, and brings the slotted rod 42 and the knuckle joint into the locking position illustrated in solid lines in Fig. 1. The slotted rod 42 is also acted upon by a spring 46 which tends to move the slotted rod 42, and with it the knuckle joint, in the opposite direction for retraction of the stop 27.

The pull exerted by the winding 28 upon the armature 45 when a suitable current flows through the winding is greater than the pull exerted by the spring 46. Consequently, when the circuit 23 is closed, the knuckle joint and the stop 27 are brought into the locking position, whereas the stop is retracted by the pull of spring 46 when the circuit 23 is opened. In order that the stop 27 may be retracted when the pressure of the starting air in accumulator b has reached the requisite value, the latter pressure acts upon a piston 47 slidable in a cylinder 48 against the actions of a spring 49, a rod 50 connected to the piston 47 controlling the switch 29.

The slide valve 30 is controlled by a piston 51 adapted to move in a cylinder 52 in which it is subjected on the one hand to the pressure which exists in the casing 9 and which is transmitted to the cylinder 52 through a pipe 53, and on the other hand to the action of a spring 54. The latter tends to bring the piston 51, and with it the slide valve 30, into a position in which the pipe 36 is open, whereas the pressure applied through the pipe 53 tends to bring the slide valve 30 into a position in which the pipe 36 is closed.

In order to prevent the low pressure produced in the accumulators for bringing the piston assemblies into starting position from acting through the stabiliser upon the interior of casing 9, there is provided, in the region in which the stabiliser is connected to the pipe 14, a valve 55 which is connected with a piston 56 of a diameter greater than the diameter of the valve. The pressure in the pipe 14 acts upon one face of piston 56 while a spring 57 acts upon the other face thereof. When a low pressure exists in the accumulators, the valve 55 is closed, but the valve opens when a pressure greater than atmospheric pressure exists in the accumulators.

It should be noted that, in an engine having two sets of opposed free pistons, the starting device hereinbefore described is of course only provided at one end of the engine. Owing to the pipe 14 which interconnects the two accumulators $b$, the pressures in the two accumulators are always substantially the same, although only one accumulator may be directly connected to the starter. Furthermore, by virtue of the connection between the two free piston assemblies which is formed by the synchronising means 10 to 13, the locking of one such arrangement simultaneously causes locking of the other such arrangement.

When the gas generator hereinbefore described is stationary, so that there is no pressure in the casing, and when the circuit 23 is also open because the switch 26 is open, the piston assemblies 3, 4 are brought into their outermost end positions through the action of the reduction of pressure produced in accumulators $b$ by placing the interior thereof in communication with the vacuum source. In this position, the rod 31 closes the switch 24. The switch 29 is also closed as a result of the reduction of pressure in accumulators $b$.

Since the piston assemblies are therefore now in a position permitting starting, the operator of the plant merely has to close the switch 26 in order to initiate starting. This causes the winding 28 to draw the armature 45 toward the left, thus bringing the stop 27 into active position, i. e. in the path of the hook 27a which, in the outermost end position of the piston assembly 3, 4 has passed beyond stop 27 and is located on the left thereof in Fig. 1. Simultaneously, the closing of the switch 26 energizes the winding 25 the armature 34 of which pulls the slide valve 35 into the position where it cuts off the communication between the pipes 36 and 38 and establishes communication between the pipes 36 and 37. Compressed air therefore enters accumulators $b$, the pressure therein increasing continuously and moving the piston assembly 3, 4 slightly inwards toward the left until the hook 27a engages the stop 27. As a result of this initial inward movement of the pistons 3, 4, the rod 31 ceases to act upon the switch 24, but the latter is kept closed by the action of the winding 33 on the armature 32. When the pressure of the starting air in accumulators $b$ has reached the requisite value for starting, the piston 47 is pushed towards the left and opens the switch 29 and therefore the circuit 23. Consequently, the armature 45 ceases to be attracted by the winding 28 and the spring 46 acts upon the knuckle joint 41 and brings the stop 27 into the retracted position. The starting air in the accumulators can therefore drive the now unlocked free pistons inwards. Since the action of the winding 25 on the armature 34 has likewise ceased, the spring 39 brings the slide valve 35 into the position in which the latter places the pipe 36 in communication with the pipe 38. However, as soon as the pistons 3, 4 have reached the end of their first inward stroke, they deliver compressed air into the casing 9, with the result that a pressure is built up therein and brings the slide valve 30 into the closed position. At the end of the first stroke of the piston assemblies, the first injection of fuel occurs and the engine then runs normally. If for any reason the first stroke of the arrangement should not result on normal starting, pressure in the casing 9 would drop almost instantaneously, the slide valve 30 would open the pipe 36, and the pistons would be returned to their outermost end position by the drop of pressure thus produced in the accumulators. If at this moment the switch 26 is still closed, a new starting operation will be initiated automatically by the closing of the switch 24 by the rod 31. If the switch 26 is already open at this time, the operator will have to reclose it. For the rest, the same phenomena would have occurred if the engine had not started at the first attempt and if the slide valve 30 had not closed.

The engine is stopped in conventional manner by stopping fuel injection into the power cylinder. If, at the time the engine is to be stopped, the switch 26 has not yet been opened, it must be opened at the same time as injection is stopped. When the engine stops, the pressure in the casing 9 decreases, the slide valve 30 opens and the resulting drop of pressure in the accumulators $b$, brings the piston assemblies into the outermost end positions, where they remain until the switch 26 is again closed.

Figure 2:
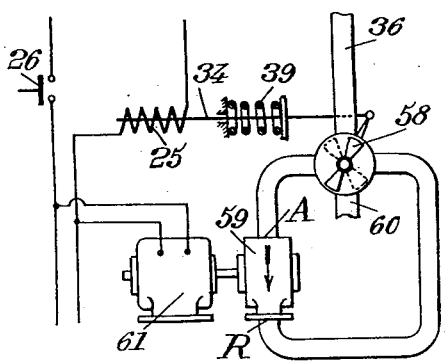

According to a particularly advantageous modification, I may use a single and same device for supplying the compressed starting air and for acting as a suction pump to produce the suction in the accumulators which bring the piston assemblies into their outermost end positions. This modification is particularly useful for road vehicles. A first embodiment of such a modification is illustrated in Fig. 2, wherein the slide valve 35 is replaced by a change-over vane 58 which, in the position shown in solid lines in Fig. 2, connects the pipe 36 to the intake A of a compressor 59, the output R of which communicates, for this position of the vane 58, with the atmosphere at 60. If the vane 58 is moved, by the pull exerted by the winding 25 upon the armature 34, into the position indicated in dotted lines, the pipe 36 is connected to the output R of the compressor 59 and places the intake A thereof into communication with the atmosphere at 60.

The compressor 59 is driven by an electric motor 61.

Figure 3:
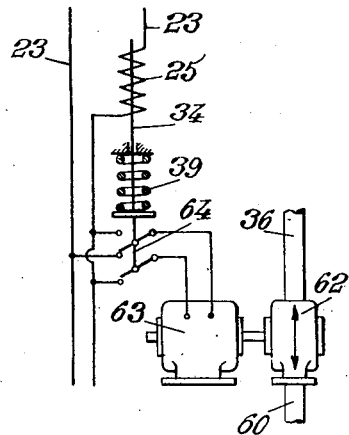

In the modification illustrated in Fig. 3, the supply of compressed air to the accumulator $b$ and the reduction of the pressure therein are produced by reversible compressor 62, that is to say, by means of a compressor which sucks or compresses through the same connection, according to the direction in which it rotates. The reversible compresor is driven, as shown in Fig. 3, by an electric motor 63 which is also reversible. In this case, the control member 25 and the opposing spring 39 control an electric switch 54 which, according to its position, causes the motor 63 to rotate in one or the other direction.

It should be noted that the compressors 59 or 62 which are employed in the modifications illustrated in Figs. 2 and 3 can also be used as suction or compression pumps for the brakes of the road vehicle on which are mounted the gas generator and the starter therefor.

In the embodiment illustrated in Fig. 1, the knuckle joint 41 is controlled solely by forces exerted by the spring 46 and by the action of the winding 28 upon the rod 45. The elongated aperture 43 is provided in the slotted rod 42 in order that these forces may be adequate to trip the knuckle joint, since it permits the rod 42 to acquire some speed before striking the pin 44 of the knuckle joint and bringing the latter very rapidly from one operative position into the other.

In some cases, however, it may be desirable to augment the electromagnetic action of the winding 28 or the force of the spring 46 by an appropriate pneumatic action which can, if desired, replace the forces exerted by the members 28, 45 on the one hand and 46 on the other hand.

Figure 4:
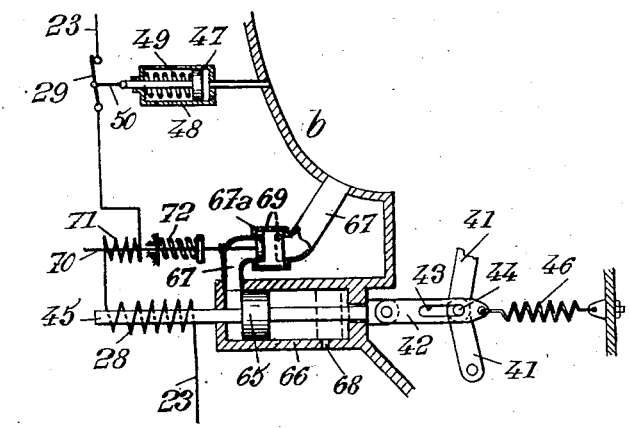

Thus, Fig. 4 illustrates a modification in which the effects of the winding 28 and the armature 45 on the one hand and of the spring 46 on the other hand are augmented by pneumatic means responsive to the pressure or the suction in the accumulator $b$. To this end, I provide a piston 65 fixed, for example, to the rod connecting the slotted link 42 to the armature 45, this piston 65 being disposed within a cylinder 66. One end of the cylinder 66 is connected through a pipe 67 with the accumulator $b$ while the other end of cylinder 66 comprises a venting port 68 closed by the piston 65 when at the right-hand end of its stroke. An enlarged part 67a of the pipe 67 forms two opposed valve seats for a valve 69, the rod of which forms an armature 70 which cooperates with a winding 71 inserted in the circuit 23. The rod 70 is also acted upon by a spring 72 which tends to urge the valve 69 against the valve seat on the right-hand side of the enlarged part 67a of the pipe 67 (see position of the valve 69 indicated in dotted lines). When an electric current flows through the winding 71, the valve 69 is urged to the other valve seat (formed on the left-hand side of the enlarged part 67a), this position of valve 69 being that indicated in solid lines. The valve 69, when in either of these two positions, closes the pipe 67.

As long as the circuit 23 is open, the piston 65 and the valve 69 are in the right-hand position illustrated in dotted lines. The low pressure which exists at this time in the accumulator cannot act on the piston 65 through the pipe 67 because the latter is closed by the valve 69. If the circuit 23 is now closed for starting, the piston 65 and the valve 69 are attracted by the respective windings 28 and 71 and moved to the left. During this movement of the valve 69 from its right-hand to its left-hand position, the low pressure in accumulator b is able to act upon the piston 65 in the cylinder 66 and thus to assist in the movement of the piston 65 and the slotted link 42 to the left.

When the circuit 23 is opened after the end of the starting operation, so that the valve 69 and the piston 65 are to move to the right, the pressure then existing in the accumulator b can act upon the piston 65 for the period during which the valve 68 moves from its left-hand to its right-hand position. The pressure in the accumulator b now assists the movement of the piston 65 and of the slotted link 42 to the right.

Figure 5:
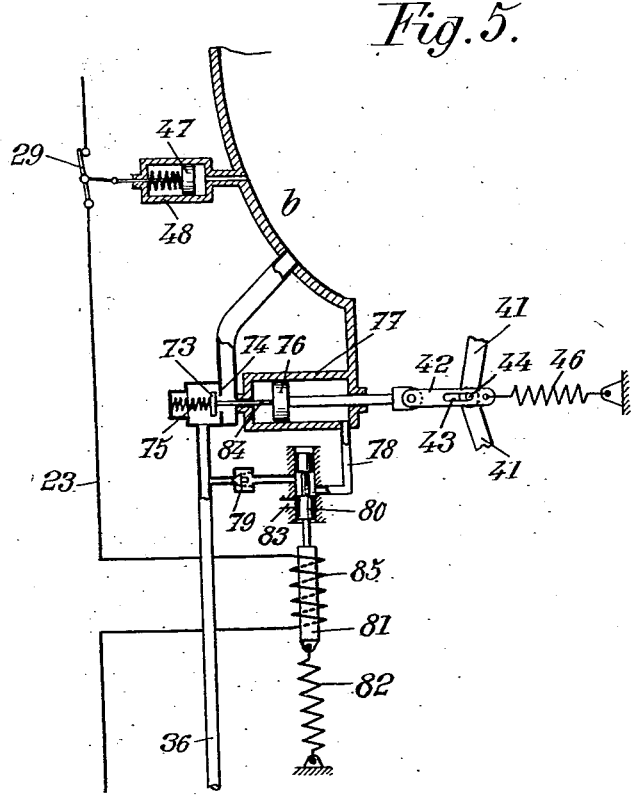

In the modification illustrated in Fig. 5 the means controlling the stop 27 serve to control the supply of compressed starting air into the accumulator b, so that the compressed air cannot be introduced into the accumulator b until the stop 27 has been moved into its operative position.

For this purpose, I provide, in the pipe 36, a valve 73 so arranged that compressed air arriving through the pipe 36 tends to urge the valve 73 upon a valve seat 74, this action being assisted by a spring 75, whereas a drop in pressure produced in the pipe 36 opens the valve 73 against the action of the spring 75. As a result, the valve 73 does not prevent the low pressure produced in the pipe 36 from reaching the accumulator b and from producing an outward movement of the piston assemblies 3, 4 into their starting positions. On the contrary, as soon as the suction transmitted through this pipe 36 ceases, the valve 73 closes and does not allow of compressed air being supplied through this pipe 36 to the accumulator b until the valve 73 is reopened by the effect of an external control. According to the arrangement under consideration, such external control is provided by the means which also control the stop 27. Said means comprise a piston 76 movable in a cylinder 77 and the rod of which is connected to the slotted link or rod 42. One end of the cylinder 77 is connected through a pipe 78 with the pipe 36, the communication between the two last mentioned pipes being controlled by two valves mounted in series, to wit, a non-return valve 79 and a distributor 80. The rod of this distributor 80 is controlled on the one hand by a winding 85 co-operating with an armature 81 rigidly connected to the rod and on the other hand by a tension spring 82. When current flows through winding 85, which is inserted in the circuit 23, the winding 85 attracts the armature 81 upwardly so that the distributor 80 is brought into the upper position as shown in Fig. 5. The spring 82 is thereby put under tension. On the other hand, if the circuit 23 is opened, the spring 82 brings the distributor 80 into the lower position in which the distributor connects the pipe 78 to a port 83 opening to the atmosphere.

The valve 73 has a rod 84 which extends through the base of the cylinder 77 and which projects within this cylinder.

The arrangement illustrated in Fig. 5 operates as follows.

When the circuit 23 is closed, the distributor 80 is brought into its upper position shown in Fig. 5, so that the compressed air then arriving through the pipe 36 can flow past the valve 79 and the distributor 80 into the cylinder 77. This compressed air moves the piston 76 to the left and thus brings the stop 27 into the operative position through the agency of the slotted rod 42 and the knuckle joint 41. The piston 76, at the end of its leftward stroke, that is to say when the stop 27 has reached its operative position, engages the rod 84 of the valve 73 and opens this valve. The compressed air supplied through the pipe 36 can now reach the accumulator b and fill it with the requisite quantity of starting air.

The effect of the non-return valve 79 is to prevent premature escape of compressed air from the cylinder 77 and, therefore, to prevent a premature return of the piston 76 to the right which might otherwise occur because of the pressure drop which occurs in the pipe 36 at the instant at which the piston 76 opens the valve 73.

As soon as the starting pressure in the accumulator b has reached the desired value, the circuit 23 is opened in the manner hereinbefore described because of the opening of the switch 29, with the result that the spring 82 can move the distributor 80 downward and thus place the cylinder 77 into communication with the atmosphere through the port 83. The cylinder 77 is, therefore, exhausted rapidly and the spring 46 can move the slotted rod 42 and the piston 76 to the right and in so doing unlock the locking device 27, 27a. The starting stroke is, therefore, effected in the manner already described.

A device such as is illustrated in Fig. 5, therefore, makes it impossible to introduce starting air into the accumulator b until the stop 27 has been brought into a position in which it maintains the piston assemblies 3, 4 locked in the starting position thereof.

Whichever embodiment is used, the invention provides a starter for a free piston engine, particularly for a free piston gas generator, which enables the plant operator to effect starting by a remote control which is very reliable in operation and which can be used satisfactorily with the energy sources available in a vehicle.

The locking element, instead of acting directly on one of the pistons, might act indirectly thereon, for instance through an element such as the lever 10 of the synchronising means.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. For use in connection with a free piston engine including a driving part essentially constituted by at least one power cylinder and at least one power piston movable in said power cylinder and a compressor part essentially constituted by at least one compressor cylinder rigid with said power cylinder and at least one compressor piston rigid with said power piston and movable in said compressor cylinder, a device for starting said engine which comprises, in combination, means constituted by cooperating parts connected to said cylinders and pistons of said engine and forming a variable volume chamber for starting said engine when the volume of said chamber is suddenly increased, locking means interposed between said cooperating parts for preventing relative movement thereof in response to an increase of the pressure in said chamber capable of producing such sudden increase of the volume thereof, means responsive to variation of the pressure in said chamber for bringing said locking means out of action in response to an increase of said pressure beyond a predetermined value, means for feeding compressed air to said chamber, a circuit for the transmission of energy therethrough, means operative by such energy and inserted in said circuit for bringing said compressed air feeding means into action in response to the closing of said circuit, switch means inserted in said circuit, means operative by said pistons for placing said switch means in closed position when said pistons reach a predetermined outer position, and manually operated control switching means for closing said circuit.

2. For use in connection with a free piston engine including a driving part essentially constituted by at least one power cylinder and at least one power piston movable in said power cylinder and a compressor part essentially constituted by at least one compressor cylinder rigid with said power cylinder and at least one compressor piston rigid with said power piston and movable in said compressor cylinder, a device for starting said engine which comprises, in combination, means constituted by cooperating parts connected to said cylinders and pistons of said engine and forming a variable volume chamber for starting said engine when the volume of said chamber is suddenly increased, means for feeding compressed air to said chamber, locking means interposed between said cooperating parts for preventing relative movement thereof in response to an increase of the pressure in said chamber capable of producing such sudden increase of the volume thereof, means responsive to variation of the pressure in said chamber for bringing said locking means out of action in response to an increase of said pressure beyond a predetermined value, valve means interposed between said compressed air feeding means and said variable volume chamber for controlling the delivery of air under pressure from said compressed air feeding means to said chamber, a circuit for the transmission of energy therethrough, means operative by such energy for opening said valve means, said last mentioned means being inserted in said circuit, switch means inserted in said circuit, means operative by said pistons for placing said switch means in closed position when said pistons reach a predetermined outer position, and manually operated control switching means for closing said circuit.

3. For use in connection with a free piston gas generator including a driving part essentially constituted by at least one power cylinder and at least one power piston movable in said power cylinder and a compressor part essentially constituted by at least one compressor cylinder rigid with said power cylinder and at least one compressor piston rigid with said power piston and movable in said compressor cylinder, the portion of said compressor cylinder on the other side of said compressor piston from said power piston forming a variable volume chamber, a device for starting said engine which comprises, in combination, locking means interposed between said pistons and said cylinders for preventing inward movement of said power piston with respect to said power cylinder from the outer dead center position of said power piston, means responsive to variation of the pressure in said chamber for bringing said locking means out of action in response to an increase of said pressure beyond a predetermined value, means for feeding compressed air to said chamber, a circuit for the transmission of electric energy therethrough, means operative by electric energy and inserted in said circuit for controlling said compressed air feeding means to bring them into action in response to the closing of said circuit, switch means inserted in said circuit, means operative by said pistons for placing said switch means in closed position when said pistons reach a predetermined outer position, electric means inserted in said circuit for keeping said switch means in closed position as long as said circuit is closed, and manually operated control switching means for closing said circuit.

4. For use in connection with a free piston gas generator including a driving part essentially constituted by at least one power cylinder and at least one power piston movable in said power cylinder and a compressor part essentially constituted by at least one compressor cylinder rigid with said power cylinder and at least one compressor piston rigid with said power piston and movable in said compressor cylinder, the portion of said compressor cylinder on the other side of said compressor piston from said power piston forming a variable volume chamber, a device for starting said engine which comprises, in combination, means for feeding compressed air to said chamber, locking means interposed between said pistons and said cylinders for preventing inward movement of said power piston with respect to said power cylinder from the outer dead center position of said power piston, means responsive to variation of the pressure in said chamber for bringing said locking means out of action in response to an increase of said pressure beyond a predetermined value, valve means interposed between said compressed air feeding means and said variable volume chamber for controlling the delivery of air under pressure from said compressed air feeding means to said chamber, a circuit for the transmission of electric energy therethrough, means operative by electric energy for opening said valve means, said last mentioned means being inserted in said circuit, switch means inserted in said circuit, means operative by said pistons for placing said switch means in closed position when said pistons reach a predetermined outer position, and manually operated control switching means for closing said circuit.

5. For use in connection with a free piston gas generator including a driving part essentially constituted by at least one power cylinder and at least one power piston movable in said power cylinder and a compressor part essentially constituted by at least one compressor cylinder rigid with said power cylinder and at least one compressor piston rigid with said power piston and movable in said compressor cylinder, the portion of said compressor cylinder on the other side of said compressor piston from said power piston forming a variable volume chamber, a device for starting said engine which comprises, in combination, means for feeding compressed air to said chamber, locking means interposed between said pistons and said cylinders for preventing inward movement of said power piston with respect to said power cylinder from the outer dead center position of said power piston, means responsive to variation of the pressure in said chamber for bringing said locking means out of action in response to an increase of said pressure beyond a predetermined value, valve means interposed between said compressed air feeding means and said variable volume chamber for controlling the delivery of air under pressure from said compressed air feeding means to said chamber, a circuit for the transmission of electric energy therethrough, means operative by electric energy for opening said valve means, said last mentioned means being inserted in said circuit, switch means inserted in said circuit, means operative by said pistons for placing said switch means in closed position when said pistons reach a predetermined outer position, electric means inserted in said circuit for keeping said switch means in closed position as long as said circuit is closed, and manually operated control switching means for closing said circuit.

6. For use in connection with a free piston gas generator including a driving part essentially constituted by at least one power cylinder and at least one power piston movable in said power cylinder and a compressor part essentially constituted by at least one compressor cylinder rigid with said power cylinder and at least one compressor piston rigid with said power piston and movable in said compressor cylinder, the portion of said compressor cylinder on the other side of said compressor piston from said power piston forming a variable volume chamber, a device for starting said engine which comprises, in combination, means for feeding compressed air to said chamber, locking means interposed between said pistons and said cylinders for preventing inward movement of said power piston with respect to said power cylinder from the outer dead center position of said power piston, means responsive to variation of the pressure in said chamber for bringing said locking means out of action in response to an increase of said pressure beyond a predetermined value, a circuit for the transmission of electric energy, means operative by electric energy in said circuit for controlling said compressed air feeding means to bring it into action in response to the closing of said circuit, electrically controlled means connected with said circuit for exerting a suction in said chamber in response to the opening of said circuit, means operative in response to the starting of said gas generator for bringing said last mentioned means out of action as soon as said gas generator is started, switch means inserted in said circuit, means operative by said pistons for placing said switch means in closed position when said pistons reach a predetermined outer position, electric means inserted in said circuit for keeping said switch means in closed position as long as said circuit is closed, and manually operated control switching means for closing said circuit.

7. For use in connection with a free piston gas generator including a driving part essentially constituted by at least one power cylinder and at least one power piston movable in said power cylinder and a compressor part essentially constituted by at least one compressor cylinder rigid with said power cylinder and at least one compressor piston rigid with said power piston and movable in said compressor cylinder, the portion of said compressor cylinder on the other side of said compressor piston from said power piston forming a variable volume chamber, a device for starting said engine which comprises, in combination, locking means interposed between said pistons and said cylinders for preventing inward movement of said power piston with respect to said power cylinder from the outer dead center position of said power piston, means responsive to variation of the pressure in said chamber for bringing said locking means out of action in response to an increase of said pressure beyond a predetermined value, an air compressor having an air intake and an output conduit, valve means interposed between said air compressor and said variable volume chamber, said valve means having two positions, one for connecting said air intake with the atmosphere and said output conduit with said chamber, and the other position for reversing said connection, a circuit for the transmission of electric energy therethrough, control means operative by electric energy for placing said valve means in said first position, said last mentioned means being inserted in said circuit, resilient means acting in opposition to, but weaker than, said control means for placing said valve means in the other of said positions when said circuit is open, switch means inserted in said circuit, means operative by said pistons for placing said switch means in closed position when said pistons reach a predetermined outer position, and manually operated control switching means for closing said circuit.

8. For use in connection with a free piston gas generator including a driving part essentially constituted by at least one power cylinder and at least one power piston movable in said power cylinder and a compressor part essentially constituted by at least one compressor cylinder rigid with said power cylinder and at least one compressor piston rigid with said power piston and movable in said compressor cylinder, the portion of said compressor cylinder on the other side of said compressor piston from said power piston forming a variable volume chamber, a device for starting said engine which comprises, in combination, locking means interposed between said pistons and said cylinders for preventing inward movement of said power piston with respect to said power cylinder from the outer dead center position of said power piston, means responsive to variation of the pressure in said chamber for bringing said locking means out of action in response to an increase of said pressure beyond a predetermined value, an air compressor having its output connected with said chamber, said compressor being reversible and constituting an air suction pump when its direction of rotation is reversed, a reversible electric motor coupled with said compressor, a source of electric current for said motor, a reversing switch for connecting said motor with said source of electric current, a circuit for the transmission of electric energy therethrough, control means operative by electric energy and inserted in said circuit for placing said switch in the position in which said compressor feeds compressed air to said chamber in response to said circuit being closed, resilient means acting in opposition to, but weaker than, said control means, for placing said switch in the other position in response to said circuit being opened, switch means inserted in said circuit, means operative by said pistons for placing said last mentioned switch means in closed position when said pistons reach a predetermined outer position, and manually operated control switching means for closing said circuit.

9. For use in connection with a free piston gas generator including a driving part essentially constituted by at least one power cylinder and at least one power piston movable in said power cylinder and a compressor part essentially constituted by at least one compressor cylinder rigid with said power cylinder and at least one compressor piston rigid with said power piston and movable in said compressor cylinder, the portion of said compressor cylinder on the other of said compressor piston from said power piston forming a variable volume chamber, a device for starting said engine which comprises, in combination, means for feeding compressed air to said chamber, a circuit for the transmission of electric energy, means operative by electric energy and inserted in said circuit for controlling said compressed air feeding means to bring it into action in response to the closing of said circuit, switch means inserted in said circuit, means operative by said pistons for placing said switch means in closed position when said pistons reach a predetermined outer position, electric means inserted in said circuit for keeping said switch means in closed position as long as said circuit is closed, locking means interposed between said pistons and said cylinders for preventing inward movement of said power piston with respect to said power cylinder from the outer dead center position of said power pistons, means operative by electric energy and inserted in said circuit for bringing said locking means into active position in response to the closing of said circuit, resilient means mounted to act in opposition to, but weaker than, said last mentioned electric energy operative means, for urging said locking means toward inactive position, whereby said locking means is brought out of action in response to the opening of said circuit, a switch in said circuit, resilient means for urging said last mentioned switch toward closed position, means responsive to variation of the pressure in said chamber for opening said last mentioned switch in response to an increase of said pressure beyond a predetermined value, and manually operated control switching means for closing said circuit.

10. For use in connection with a free piston gas generator including a driving part essentially constituted by at least one power cylinder and at least one power piston movable in said power cylinder and a compressor part essentially constituted by at least one compressor cylinder rigid with said power cylinder and at least one compressor piston rigid with said power piston and movable in said compressor cylinder, the portion of said compressor cylinder on the other side of said compressor piston from said power piston forming a variable volume chamber, a device for starting said engine which comprises, in combination, means for feeding compressed air to said chamber, a circuit for the transmission of electric energy, means operative by electric energy and inserted in said circuit for controlling said compressed air feeding means to bring it into action in response to the closing of said circuit, electrically controlled means connected with said circuit for exerting a suction in said chamber in response to the opening of said circuit, means operative in response to the starting of said gas generator for bringing said last mentioned means out of action as soon as said gas generator is started, switch means inserted in said circuit, means operative by said pistons for placing said switch means in closed position when said pistons reach a predetermined outer position, electric means inserted in said circuit for keeping said switch means in closed position as long as said circuit is closed, locking means interposed between said pistons and said cylinders for preventing inward movement of said power piston with respect to said power cylinder from the outer dead center position of said power pistons, means operative by electric energy and inserted in said circuit for bringing said locking means into active position in response to the closing of said circuit, resilient means mounted to act in opposition to, but weaker than, said last mentioned electric energy operative means, for urging said locking means toward inactive position, whereby said locking means are brought out of action in response to the opening of said circuit, a switch in said circuit, resilient means for urging said last mentioned switch toward closed position, means responsive to variation of the pressure in said chamber for opening said last mentioned switch in response to an increase of said pressure beyond a predetermined value, and manually operated control switching means for closing said circuit.

11. A device according to claim 1, further comprising means operatively connected with said locking means for discontinuing the supply of compressed air to the said variable volume chamber as long as locking means is not in action.

No references cited.